L. DATHIS.
Apparatus for Transferring Goods in Bulk.
No. 159,566. Patented Feb. 9, 1875.

2 Sheets--Sheet 1.

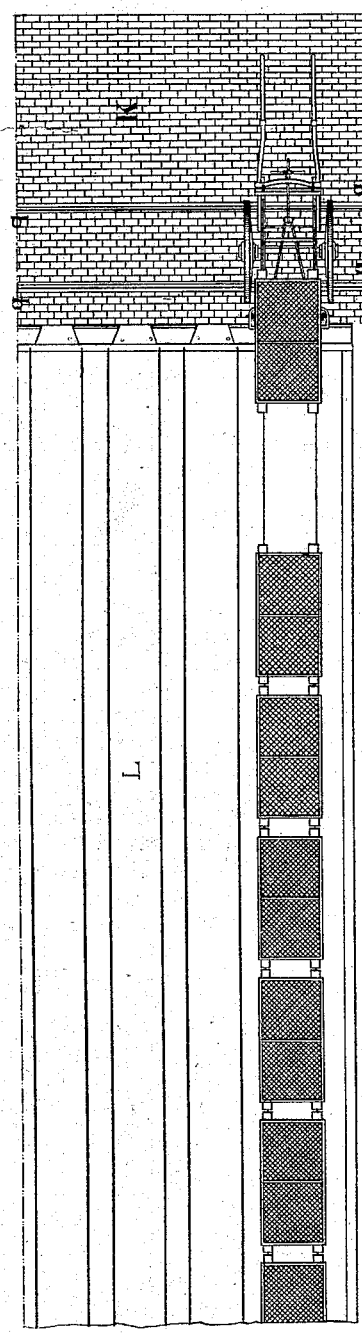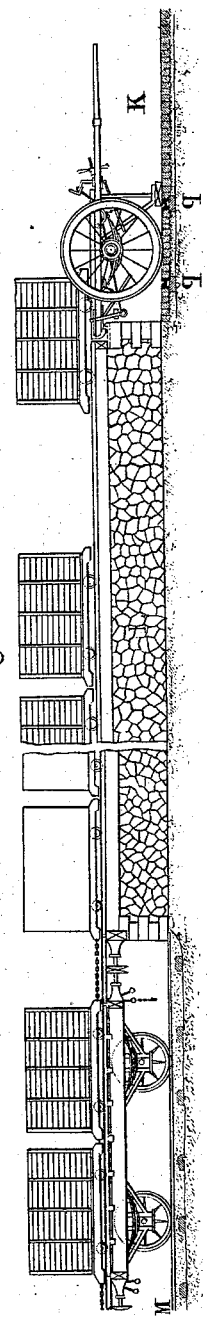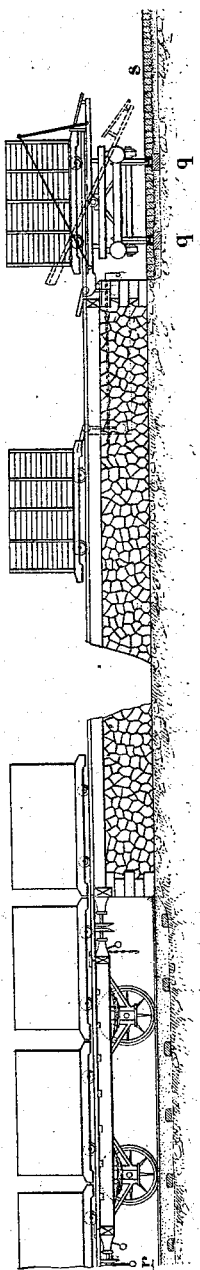

UNITED STATES PATENT OFFICE.

LEON DATHIS, OF PARIS, FRANCE.

IMPROVEMENT IN APPARATUS FOR TRANSFERRING GOODS IN BULK.

Specification forming part of Letters Patent No. 159,566, dated February 9, 1875; application filed October 5, 1874.

*To all whom it may concern:*

Be it known that I, LEON DATHIS, of Paris, France, have invented a new and Improved Mode of Transferring Goods in Bulk from Broad to Narrow Gage Cars, and vice versa; and I do hereby declare that the following is a full, clear, and exact description of the same, reference being had to the accompanying drawing, forming a part of this specification, in which—

Figure 1:
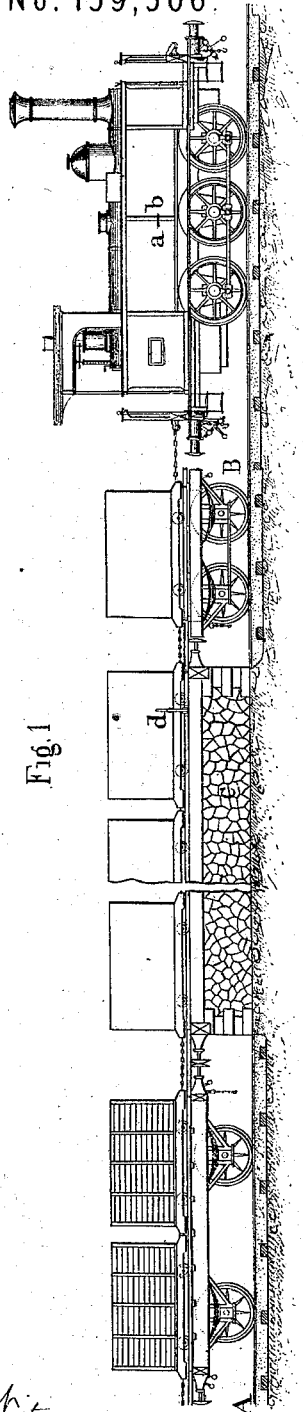
Figure 2:
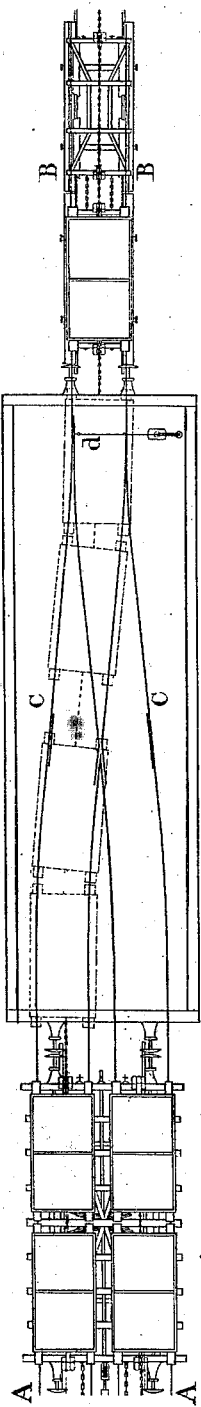
Figure 6:
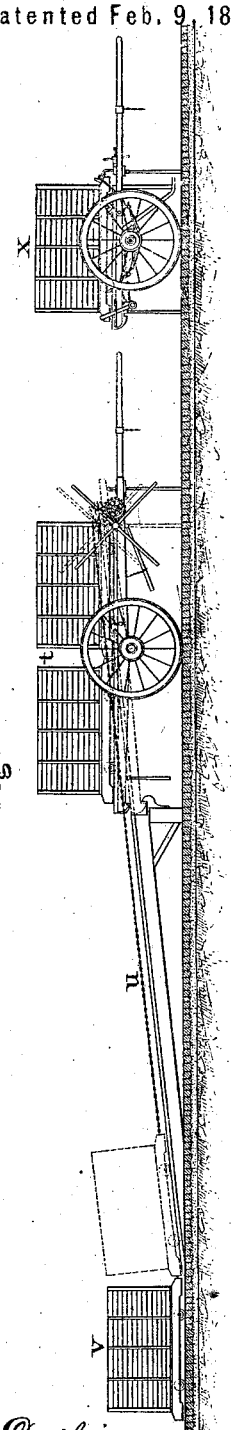

Figure 1 is a side elevation; Fig. 2, a plan view.

This invention relates to an improved mode of transferring goods in bulk from broad to narrow gage cars; and it consists in the combination, with an elevated transferring-wharf and the broad and narrow gage car-trucks, of wheeled crates which are transferred from a railway-track upon the broad-gage trucks to a similar-sized track upon the narrow-gage trucks, and vice versa.

In the drawing, A represents the trucks of the broad-gage tracks, and B the trucks of the narrow-gage tracks. Said tracks have each upon them rails of the same gage, which receive wheeled crates X, in which the goods are shipped. C is the elevated transferring-wharf, which is of the same height of the trucks A B, and is provided with rails which are of the same gage and register with the rails carried by the broad and narrow gage trucks A B, the said wharf C being provided with one or more switches, *d*, for the purpose of shifting and distributing the crates, as desired.

By means of this arrangement goods are easily and quickly transferred in bulk, thus saving labor, time, and expense, the loss and breakage consequent upon handling, and the damage from exposure to the weather.

What I claim is—

The combination of elevated transferring-wharf C, broad-gage car-truck A, and narrow-gage car-truck B, each bearing railway-tracks of the same gage with the wheeled crates X, for the purpose of running such crates from the rails on the broad-gage truck, across the transferring-wharf, upon the rails carried by the narrow-gage truck, or vice versa, all substantially as set forth.

LEON DATHIS.

Witnesses:
SILVIO MOLINER,
CHARLES DESNOS.